United States Patent
Angiolini et al.

(10) Patent No.: US 7,022,772 B2
(45) Date of Patent: *Apr. 4, 2006

(54) OPTICAL FILM COMPRISING POLYARYLATES CONTAINING BIS-(HYDROXYPHENYL)-FLUORENE-ORTHO-DISUBSTITUTED BISPHENOLS

(75) Inventors: Simone Angiolini, Caracare (IT); Mauro Avidano, Casale Monferrato (IT); Paolo Salvarani, Savona (IT); Roberto Bracco, Savona (IT)

(73) Assignee: Ferraria Technologies S.p.A., Cairo Montenotte (IT)

(*) Notice: Subject to any disclaimer, the term of this patent is extended or adjusted under 35 U.S.C. 154(b) by 157 days.

This patent is subject to a terminal disclaimer.

(21) Appl. No.: 10/643,212

(22) Filed: Aug. 18, 2003

(65) Prior Publication Data

US 2004/0192848 A1    Sep. 30, 2004

Related U.S. Application Data

(63) Continuation-in-part of application No. 09/829,530, filed on Apr. 10, 2001, now Pat. No. 6,632,886.

(30) Foreign Application Priority Data

Nov. 14, 2000    (IT) ........................... SV2000A0053

(51) Int. Cl.
- C08L 27/12    (2006.01)
- C08F 283/02    (2006.01)
- C08G 73/24    (2006.01)

(52) U.S. Cl. .................... 525/199; 525/153; 525/328.6; 525/330.7; 525/534; 525/539; 528/125; 528/176; 528/191; 528/401; 528/421; 428/423.7

(58) Field of Classification Search ................ 525/199, 525/153, 328.6, 534, 539, 330.7; 528/125, 528/176, 191, 461; 428/421, 423.7
See application file for complete search history.

(56) References Cited

U.S. PATENT DOCUMENTS

| | | | |
|---|---|---|---|
| 3,546,165 A | 12/1970 | Morgan ........................ | 260/47 |
| 4,066,623 A | 1/1978 | Besso et al. ................ | 528/182 |
| 4,387,209 A | 6/1983 | Rieder et al. ................ | 528/176 |
| 4,401,803 A | 8/1983 | Rieder ........................ | 528/176 |
| 4,533,511 A | 8/1985 | Mark ........................ | 264/184 |
| 4,810,771 A | 3/1989 | Teramoto et al. ........... | 528/298 |
| 4,967,306 A | 10/1990 | Hampl, Jr. et al. ......... | 361/323 |
| 5,007,945 A * | 4/1991 | Tien et al. .................... | 95/54 |
| 5,232,471 A | 8/1993 | Chen et al. .................... | 95/54 |

(Continued)

FOREIGN PATENT DOCUMENTS

EP    0 943 640    9/1999

(Continued)

OTHER PUBLICATIONS

Abstract of Japanese Patent JP 09071640-A.

(Continued)

*Primary Examiner*—Duc Truong
(74) *Attorney, Agent, or Firm*—Mark A. Litman & Assoc., P.A.

(57) ABSTRACT

The present invention refers to a polymeric optical film the polymer of the polymeric optical film consisting essentially of one or more polyarylates having repeating units represented by the general structure:

$$-\!\!\!+\!\!A\!-\!\!B\!+\!\!\!\!-_n$$

wherein A represents one or more different bisphenolfluorene radicals having the general formula (I):

(I)

[Structure showing fluorene-based bisphenol with substituents $R_1$, $R_2$, $R_3$, $R_4$, $R_5$, $R_6$]

wherein $R_1$ and $R_2$ independently represent an alkyl group, a halogen atom, an alkoxy group, an acyl group, a phenyl group or a nitrile group, with the proviso that $R_1$ and $R_2$ are not both an alkyl group; $R_3$, $R_4$, $R_5$ and $R_6$ represent a hydrogen atom, an alkyl group, a halogen, an alkoxy group, an acyl group, a phenyl group, a nitro group, or a nitrile group, with the proviso that when $R_1$ and $R_2$ are both bromide atoms, at least one of $R_3$, $R_4$, $R_5$ and $R_6$ is different from hydrogen atom;

B represents one or more different dicarboxy radicals having the formula:

[Structure: $\ce{>C(=O)-X-C(=O)<}$]

wherein X is a divalent aromatic hydrocarbon group having from 6 to 20 carbon atoms, and n is the number of the repeating units which build up the polymer and is a positive integer higher than 20.

The optical film of the present invention has excellent mechanical and thermal properties, a high Tg and does not readily yellow upon exposure to light.

25 Claims, No Drawings

U.S. PATENT DOCUMENTS 6,632,886 B1 * 10/2003 Angiolini et al. ........... 525/199

FOREIGN PATENT DOCUMENTS

WO    WO 00/33949    6/2000

OTHER PUBLICATIONS

Journal of Applied Polymer Science, vol. 29, pp. 35-43; (1984).

* cited by examiner

OPTICAL FILM COMPRISING POLYARYLATES CONTAINING BIS-(HYDROXYPHENYL)-FLUORENE-ORTHO-DISUBSTITUTED BISPHENOLS

This application is a CIP of Ser. No. 09/829,530 filed on Apr. 10, 2001, now U.S. Pat. No. 6,632,886.

BACKGROUND IF THE INVENTION

1. Field of the Invention

The present invention relates to a novel optical film comprising one or more polyarylates obtained from the condensation of one or more bifunctional phenolic units having specific substitutions with one or more bicarboxylic acid. More precisely, the present invention refers to a novel optical film, comprising one or more ortho-disubstituted bis(hydroxyphenyl)fluorene bisphenol polyarylates, having an excellent stability to ultraviolet and visible light, heat resistance, light transparency, high glass transition temperature (Tg) and very good mechanical properties.

2. Background of the Art

Optical films are well known in the art. Glass has been widely used for several optical applications, due to its excellent characteristics, such as transparency, a high transmittance in the visible light range and temperature resistance. Notwithstanding these benefits, due to its high weight and very high brittleness, the use of glass as a sublayer or support in optical applications may cause problems to the final product realization. In addition, because glass is not flexible, it cannot be used in continuous processing. This leads to a very low final productivity. For these reasons, it is undesirable to replace glass with transparent polymeric films, such as polyesters (e.g., polyethyleneterephthalate), polyacrylates (e.g., polymethylmethacrylate) or polycarbonate. Even if these polymeric materials have good handling properties, they have, however, the disadvantage of poor transmittance, limited heat resistance and a low glass transition temperature (Tg), whereby the employment of these polymers in optical applications has been very limited.

Polyesters of 9,9-bis-(4-hydroxyphenyl)-fluorene and isophthalic or terephthalic acid are known in the art. U.S. Pat. No. 3,546,165 describes such polyesters, which are thermally stable, but generally have a relatively low inherent viscosity and unsatisfactory mechanical properties. U.S. Pat. No. 4,387,209 describes polyesters made by reacting 9,9-bis-(4-hydroxyphenyl)-fluorene with at least one member of the group consisting of isophthalic or terephthalic acid and using an interfacial polymerization process. The polyester inherent viscosity strongly depends upon the monomer purity, and relatively small variations in purity of the diphenol monomer may cause large deviations in the inherent viscosity values. Example 2 of U.S. Pat. No. 4,401,803 describes the preparation of polyesters of 9,9-bis-(4-hydroxyphenyl)-fluorene and a 50:50 mixture of isophthalic and terephthalic acid chloride using an interfacial polymerization process. The polyester is precipitated with an acetone-methanol blend to produce a material with an inherent viscosity of 1.67 dl/g. U.S. Pat. No. 4,533,511 discloses a process for spinning fibers obtained from the polycondensation product of 9,9-bis-(4-hydroxyphenyl)-fluorene and a mixture of isophthalic acid chloride and terephthalic acid chloride. Dichloromethane is suggested as a spinning solvent and the solvent precipitant preferably is an aqueous lower alkanol.

U.S. Pat. No. 4,066,623 discloses that certain aromatic, halogenated polyesters, prepared by inverted interfacial polymerization methods provide a polymer having a low content of low molecular weight fractions which causes a low polymer resistance with respect to the solvent.

U.S. Pat. No. 4,967,306 discloses a 9,9-bis-(4-hydroxyphenyl)-fluorene/isophthalic and terephthalic acid polyester which contains a very low level of oligomeric material and has a tensile strength, elongation, chemical resistance, temperature stability, ultraviolet resistance and vacuum stability higher than the copolymers containing oligomeric species described in the art. Films containing small amounts of oligomer will "yellow" or degrade upon limited exposure to ultraviolet radiation.

The same polyarylate comprising 9,9-bis-(4-hydroxyphenyl)-fluorene and isophthalic and terephthalic acid is also described in JP patent application 57-192432. However, the resin color tends to the yellow upon exposure to UV radiation due to the diphenol component structure, thus making difficult the use of the resin in optical applications.

The resin obtained from the polyarylate is composed of 9,9-bis-(3-methyl-4-hydroxyphenyl)-fluorene and isophthalic acid as reported in Journal of Applied Polymer Science, Vol. 29, p. 35 to 43 (1984). The polymer composed merely of isophthalic acid, results to be too fragile and has insufficient abrasion resistance and film coating quality.

Japanese Patent Application No. 09-071,640 discloses a resin composed of (a) an aromatic dicarboxylic acid, (b) a specific amount of a substituted 9,9-bis-(4-hydroxyphenyl)-fluorene and (c) an aliphatic glycol; said resin is utilized in optical materials for its good transparency and heat resistance.

U.S. Pat. No. 4,810,771 discloses polyesters made of mono-ortho substituted bisphenols, and a blend of isophthalic and terephthalic acid.

EP Patent Application 943,640 describes a film prepared with polyarylates synthesized using bisphenolfluorenes mono- and bi-substituted in the ortho position with alkyl (C1–C4) groups. Such polyarylates have a better stability to ultraviolet radiation. 9,9-bis(3,5-dibromo-4-hydroxyphenyl)-fluorene bisphenol monomer derived polyarylates have been disclosed in PCT Patent Application No. WO 00-33,949 as gas-separation membranes. In U.S. Pat. No. 5,007,945, there is described a polyarylate class obtained from dicarboxylic acid chlorides and cardo bisphenols having halo-substituents on all ortho positions of the phenol groups, which polymer is used to separate one or more components of a gas mixture. Such patents describe gas-separation membranes, but do not mention optical films consisting of such polymers.

The resins, known in the art, obtained from polyarylates composed of 9,9-bis(4-hydroxyphenyl)-fluorene or its ortho mono-substituted homologous, even if they have good high temperature resistance characteristics and mechanical properties, are subjected to yellowing when exposed to light sources and can be therefore hardly used in optical applications.

SUMMARY OF THE INVENTION

The present invention refers to a polymeric optical film the polymer of the polymeric optical film consisting essen tially of one or more polyarylates having repeating units represented by the general structure:

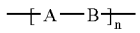

wherein A represents one or more different bisphenolfluorene radicals having the general formula (I):

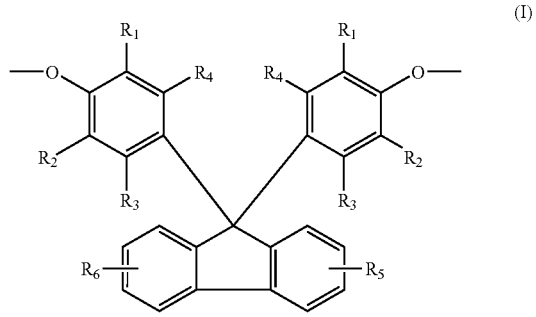

wherein $R_1$ and $R_2$ independently represent an alkyl group, a halogen atom, an alkoxy group, an acyl group, a phenyl group or a nitrile group, with the proviso that $R_1$ and $R_2$ are not both an alkyl group; $R_3$, $R_4$, $R_5$ and $R_6$ represent a hydrogen atom, an alkyl group, a halogen, an alkoxy group, an acyl group, a phenyl group, a nitro group, or a nitrile group, with the proviso that when $R_1$ and $R_2$ are both bromide atoms, at least one of $R_3$, $R_4$, $R_5$ and $R_6$ is different from hydrogen atom;

B represents one or more different dicarboxy radicals having the formula:

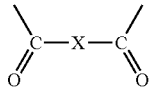

wherein X is a divalent aromatic hydrocarbon group having from 6 to 20 carbon atoms, and n is the number of the repeating units which build up the polymer and is a positive integer higher than 20.

In the above formulas, as well as in the other formulas described hereinbelow, the lines terminating without an atom or group indication represent a chemical bond. The optical film of the present invention has excellent mechanical and thermal properties, a high Tg and does not readily yellow upon exposure to light.

DETAILED DESCRIPTION OF THE INVENTION

The present invention refers to an optical film comprising one or more polyarylates having at least some repeating units represented by the general structure:

wherein A represent one or more divalent radicals A, B represents one or more divalent radicals B and wherein n is the number of the repeating units which build up the polymer and is a positive integer higher than 20.

In the above mentioned structure, the radicals A and B are structurally derived from the relative diphenol and dicarboxylic acid by removal of a hydrogen atom from the phenolic group and a hydroxy group from the carboxylic group, as if the resulting -A-B-repeating unit was obtained by a condensation reaction in which a molecule of water ($H_2O$) was removed. Although the mechanism of this reaction is not critical, and it may be possible for other reactions or reaction mechanisms to provide the same structure for the product (for example, by removal of a molecule of HCl from a phenol and a carboxylic acid chloride), that product and the individual resultant groups shall be referred to in the practice of the present invention (solely for the purposes of convenience and not for limiting the mechanism of formation) to a condensation product, condensation-like product, condensation derivative or condensation-like derivative.

The wording "one or more radical A" or "one or more radical B" means that the optical film of the present invention can contain a polyarylate deriving from the condensation of one or more radical A with one or more radical B so that the resulting polymeric structure can comprise a random structure of several different radicals A with several different radicals B, such as, for example, -A-B-A'-B'-A-B'-A'-B'-.

In the above described repeating unit, radical A represents one or more different bisphenolfluorene radicals having the general formula (I):

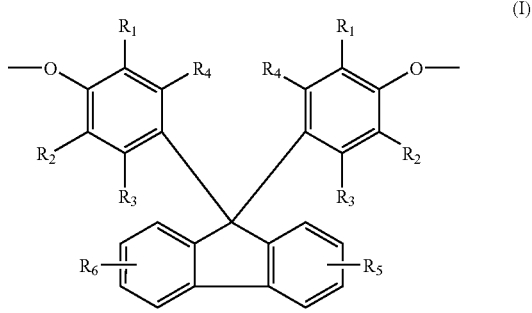

wherein $R_1$ and $R_2$ independently represent an alkyl group, a halogen, an alkoxy group, an acyl group, a phenyl group or a nitrile group, with the proviso that $R_1$ and $R_2$ are not both an alkyl group; $R_3$, $R_4$, $R_5$ and $R_6$ represent a hydrogen atom, an alkyl group, a halogen, an alkoxy group, an acyl group, a phenyl group, a nitro group, or a nitrile group, with the proviso that when $R_1$, and $R_2$ are both bromide atoms, at least one of $R_3$, $R_4$, $R_5$ and $R_6$ is different from hydrogen atom.

In the above reported formula, $R_1$ and $R_2$ preferably represent a linear or branched alkyl group having form 1 to 6 carbon atoms, such as e.g., methyl, ethyl, butyl, isopropyl; a halogen atom, such as chlorine, bromine, iodine or fluorine; a linear or branched alkoxy group having from 1 to 6 carbon atoms, such as e.g., methoxyl, ethoxyl, butoxyl; an acyl group having from 1 to 20 carbon atoms, such as e.g., acetyl, propionyl; a phenyl group or a nitrile group, with the proviso that $R_1$ and $R_2$ are not both an alkyl group; and $R_3$, $R_4$, $R_5$ and $R_6$ preferably represent a hydrogen atom, a linear or branched alkyl group, preferably having from 1 to 6 carbon atoms (such as e.g., methyl, ethyl, butyl, isopropyl);

a halogen atom (such as chlorine, bromine, iodine or fluorine); a linear or branched alkoxy group, having from 1 to 6 carbon atoms (such as e.g., methoxyl, ethoxyl, butoxyl); an acyl group having from 1 to 20 carbon atoms (such as e.g. acetyl, propionyl, etc.); a phenyl group or a nitrile group.

Preferably, radical A represents one or more different or similar bisphenolfluorene radicals having general formula (II):

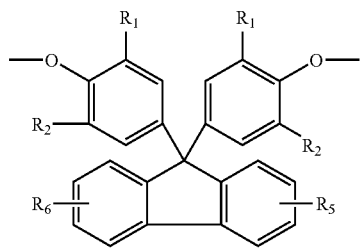

wherein $R_1$ and $R_2$ (as described above) represent a linear or branched alkyl group having from 1 to 6 carbon atoms, such as e.g. a methyl, ethyl, butyl group, a halogen atom, such as chlorine, bromine, iodine or fluorine, and $R_5$ and $R_6$ are as defined in formula (I).

In the above described repeating unit, radical B represents one or more different dicarboxy radicals having the formula:

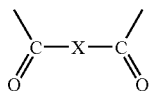

wherein X is a divalent hydrocarbon group having from 1 to 20 carbon atoms, such as, for example, a saturated or unsaturated aliphatic group (e.g., methylene group, ethylene group, propylene group, butylene group) or an aromatic group (such as a phenylene group, naphthalene group or diphenylene group).

In the above reported formula, X is preferably a divalent aromatic group having from 6 to 20 carbon atoms, such as arylene groups, naftylene groups and difenylene groups represented by the following formulas:

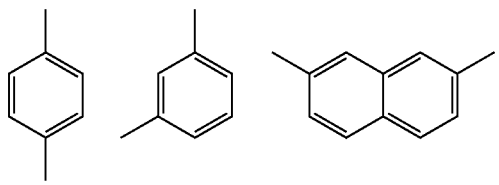

-continued

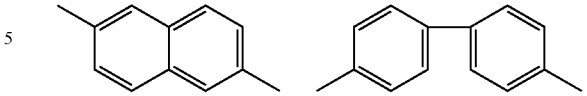

More preferably, the optical film of the present invention comprises one or more polyarylates comprising one or more different repeating units represented by general formula (III):

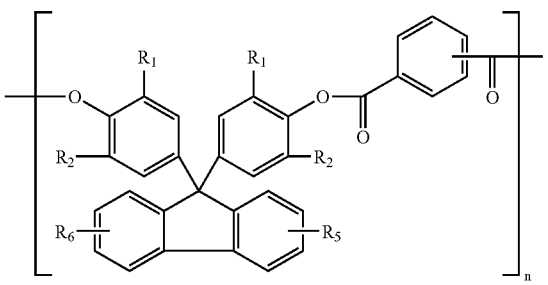

wherein $R_1$ and $R_2$ are as defined in formula (II), $R_5$ and $R_6$ are as defined in formula (I) and n is a positive integer higher than 20. Still more preferably, the present invention refers to an optical film comprising one or more polyarylates comprising two different repeating units represented by 9,9-bis-(4-hydroxyphenyl)-fluorene radicals of general formula (II) linked with two dicarboxy radicals derived from two different dicarboxylic acids, such as isophthalic acid and terephthalic acid, 1,2-dinaphthoic acid and 1,4-dinaphthoic acid, 1,1'-diphenyl-4,4'-dicarboxylic acid and 1,1'-diphenyl-4,2'-dicarboxylic acid, isophthalic acid and 1,2-dinaphthoic acid, and the like. The dicarboxylic acids are usually mixed in a weight ratio of from 1:10 to 10:1, preferably from 1:4 to 4:1. Most preferably, isophthalic acid (or a derivative thereof) and terephthalic acid (or a derivative thereof) in a weight ratio of from 1:4 to 4:1 are used.

When in the present invention the term "group" is used to describe a chemical compound or substituent, the described chemical material comprises the group, ring and base residue and that group, ring or residue with conventional substituents. When on the contrary the term "unit" is used, the unsubstituted chemical material is intended to be included. For instance, the term "alkyl group" comprises not only those alkyl units, such as methyl, ethyl, butyl, octyl, etc., but also those units bearing substituents such as halogen, nitrile, hydroxy, nitro, amino, carboxy, etc. The term "alkyl unit" on the contrary comprises only methyl, ethyl, cyclohexyl, etc.

Polyarylates useful to the present invention comprise the following repeating units (wherein n is the number of repeating unit and is an integer higher than 20), even if the present invention is not limited thereto.

(1)
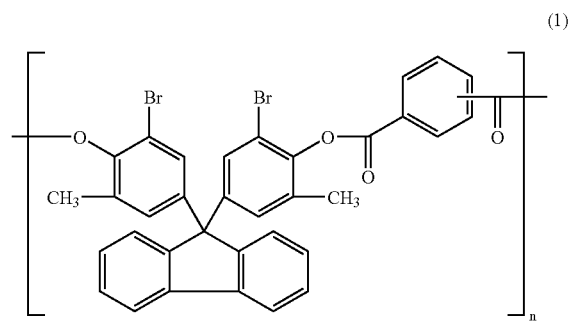
(2)
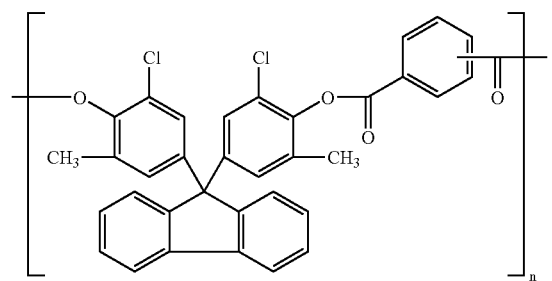
(3)
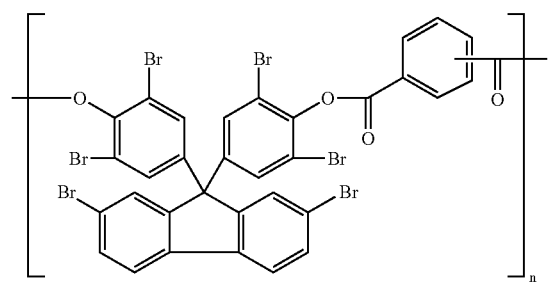
(4)
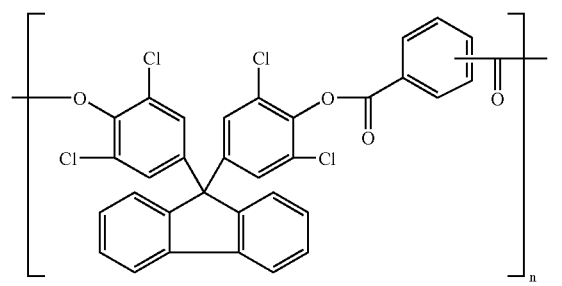
(5)
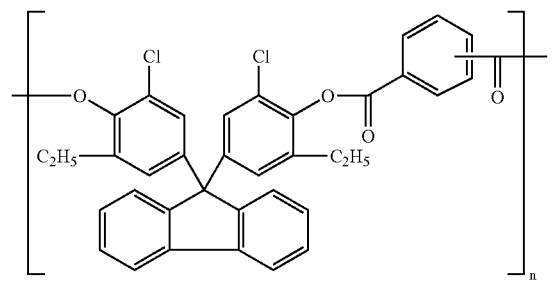

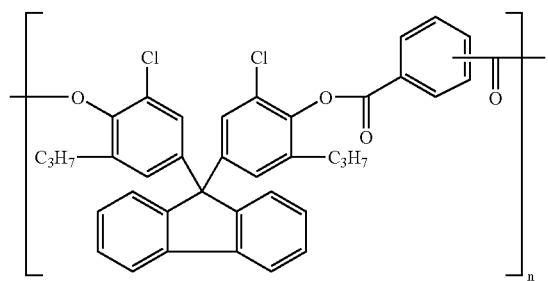
(6)
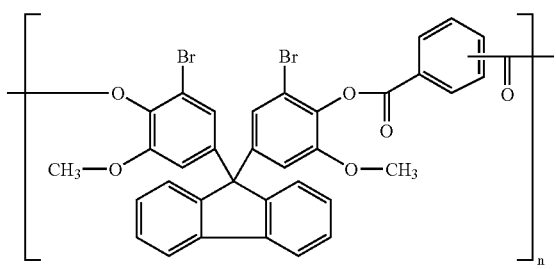
(7)
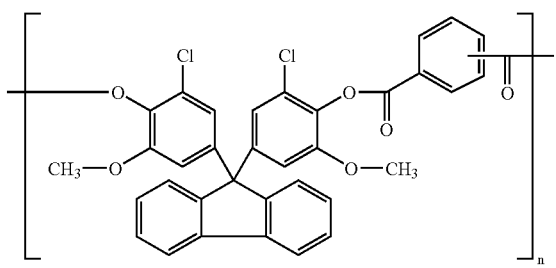
(8)
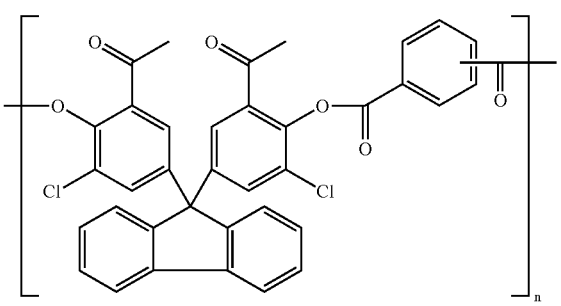
(9)
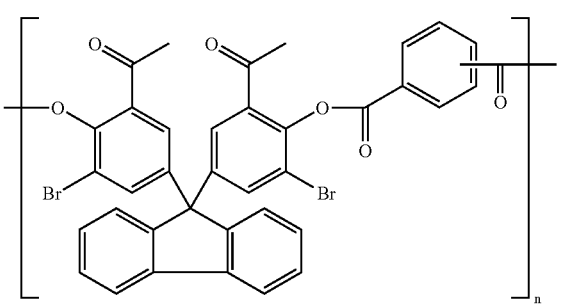
(10)

-continued

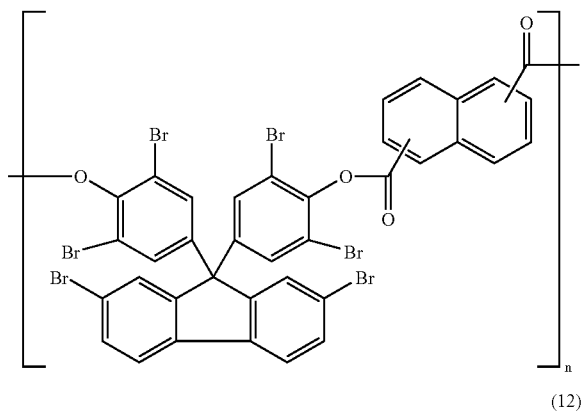

(11)

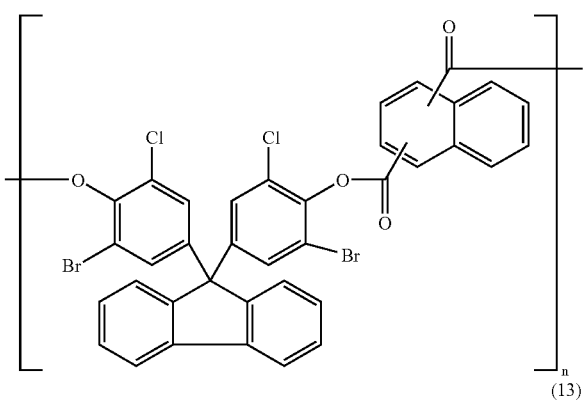

(12)

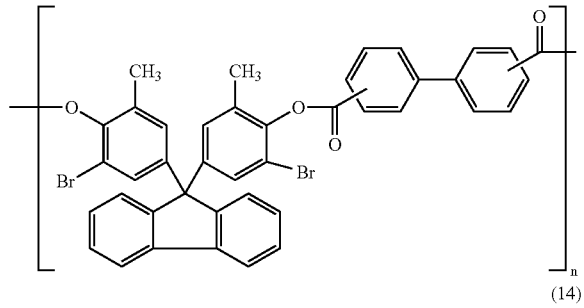

(13)

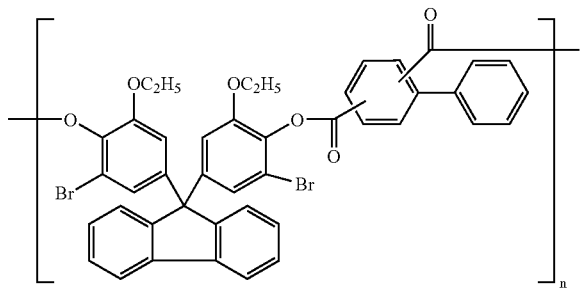

(14)

The bisphenolfluorene monomers described in the present invention have been obtained with methods known in the art, such as for instance with the method described in U.S. Pat. No. 5,248,838.

The polyarylates used in the present invention can be prepared with methods known in the art: there can be used for instance the solution polymerization method described in Ind. Eng. Chem. 51, 147, 1959, wherein a bifunctional carboxylic acid dihalide reacts with a bifunctional phenol in an organic solution; the "molten" polymerization method, wherein a bifunctional carboxylic acid and a bifunctional phenol are heated in the presence of acetic anhydride or diallylcarbonate, as described in JP patent application 38-26299; or the interfacial polymerization method, wherein a bifunctional carboxylic acid dihalide dissolved in a hydrophobic organic solvent is mixed with a bifunctional phenol dissolved in alkali water solution, as described in *J. Polymer Science*, XL399, 1959 and in EP patent applications 943,640 and 396,418.

The optical films of the present invention can be obtained with methods known in the art, such as for instance with the solvent coating technique which consists of preparing a polymer solution, herein defined as collodion, in an organic solvent and pouring this solution onto a base, such as metal, glass or plastic material; the film is then obtained after drying the collodion and subsequent release from the base. Generally, organic solvents are used, such as e.g., halogenated solvents (such as methylene chloride, chloroform, tetrachloroethane, dichloroethane, etc.) or other solvents such as N-methylpyrrolidone, N,N-dimethylformamide, dioxane, tetrahydro-furane, etc.

Other methods known in the art than can be used to obtain the films of the present invention are the one known as "spin coating", wherein the collodion is poured onto a quick-rotating base, or the hot extrusion or hot lamination methods, which are based on a molten polymer processing.

The thickness of the optical film of the present invention ranges from 0.1 to 1000 µm, preferably from 1 to 1000 µm.

The optical film of the present invention shall be highly transparent and have the slightest possible amount of impurities or surface or inside defects such as not to cause interference with the light radiation passing through it. To obtain such properties, it is advisable to filter the collodion with techniques known in the art, by using filters with pores having sizes of less than 10 µm, preferably less than 1 µm, more preferably less than 0.1 µm.

The optical film object of the present invention may have additional protective layers on one or both surfaces in order to improve some of its characteristics, such as for example solvent resistance, gas and water vapor permeability, mechanical properties, surface scratch resistance, light radiation resistance. The protective layers may consist of organic or inorganic materials or mixtures thereof and can be applied with techniques known in the art, such as for instance the solvent coating technique (described in U.S. Pat. Nos. 4,172,065; 4,405,550; 4,664,859 and 5,063,138), the vacuum coating technique (described e.g. in U.S. Pat. Nos. 4,380,212; 4,449,478; 4,485,759 and 4,817,559), the lamination technique (described e.g. in U.S. Pat. Nos. 4,844, 764; 5,000,809; 5,208,068 and 5,238,746) or resin reticulation with an electron beam or an ultraviolet radiation, as described e.g. in WO application 96-24,929 and JP 02-260145.

The optical film of the present invention, at the inside or in additional layers thereof, may contain ultraviolet radiation stabilizers, such as for instance benzophenone compounds (e.g., hydroxy-dodecyloxy benzophenones, 2,4-dihydroxy-benzophenones, and the like), triazole compounds (e.g., 2-phenyl-4-(2',2'-dihydroxybenzoyl)-triazole, substituted hydroxy-phenyltriazoles, and the like), triazine compounds (e.g., hydroxyphenyl-1,3,5-triazine, 3,5-dialkyl-4-hydroxy-phenyl-triazine, and the like), benzoate compounds (e.g., diphenolpropane dibenzoate, diphenolpropane tert.-butyl-benzoate, and the like), sterically hindered amine and other compounds like those described for instance in U.S. Pat. Nos. 4,061,616 and 5,00,809.

The optical film of the present invention, in the inside or additional layers thereof, may also contain transparent pigments to improve the film durability, such as for instance metal oxides (e.g., titanium dioxide, zinc oxide, iron oxide), metal hydroxides, chromates, carbonates, and the like, such as those described for instance in U.S. Pat. No. 5,000,809. In addition, the optical film of the present invention may also contain slip agents (such as the wetting agents described in JP patent application 02-260,145) and antioxidizing and stabilizing substances, such as, for example, sterically hindered phenol antioxidizers, organic and inorganic phosphites, ortho-hydroxybenzotriazoles or antistatic agents to decrease static charge storage and the consequent attraction of powder onto the optical film.

The optical films of the present invention can be widely used in the optical application field, such as for instance in panels or flattened layers for liquid crystal screens, in supports and protective layers for electroluminescent screens, in polarizer transparent conducting films, and similar applications due to their good mechanical properties, such as tensile strength, dimensional stability, further to being completely amorphous and transparent and having a high heat resistance and a high Tg. Their use as lens, both ophthalmic lenses, planographic lenses, and focal lenses is also contemplated in the practice of the invention.

The present invention is now illustrated by reference to the following examples which however are not construed as limiting it.

EXAMPLES

Example 1

Comparison film 1 was obtained by taking compound A and polymerizing it with the interfacial polycondensation technique as described in EP patent 396,418, utilizing a 1:1 mixture of of terephthalic and isophthalic acids. The so-obtained polymer was coated with the solvent coating technique using a 10% weight methylene chloride solution of the polymer. The film was then dried for 3 hours at a temperature of 25° C., gradually increasing the temperature up to a maximum of 160° C.

Comparison film 2 was obtained with the same procedure, but using compound B instead of compound A.

Film 3 (invention) was obtained with the same procedure, but using polymer 4 of the present invention instead of the polymer obtained from compound A.

Film 4 (invention) was obtained with the same procedure, but using polymer 2 of the present invention instead of the polymer obtained from compound A.

Film 5 (comparison) was obtained with the same procedure, but using compound C instead of compound A.

Films 1 to 5 were then exposed to a light source using an Original Hanau Xenotest 150 photostability test equipment, equipped with a 1500 W Xenon lamp delivering about 180,000 lux continuous illumination. The absorbance in the range from 320 and 500 nm was then measured before and after the exposure of 50 hours to the said light source. Tables 1a and 1b show the absorbance values of the five films measured before and after the 50 hours exposure, respectively.

TABLE 1a

| | Fresh Film | | | | |
|---|---|---|---|---|---|
| Wavelength (nm) | Film 1 (comp.) | Film 2 (comp.) | Film 3 (inv.) | Film 4 (inv.) | Film 5 (comp.) |
| 320 | 5.00 | 3.24 | 1.76 | 1.47 | 1.73 |
| 330 | 4.48 | 1.30 | 0.46 | 0.53 | 0.42 |
| 340 | 2.00 | 0.52 | 0.19 | 0.24 | 0.18 |
| 350 | 0.72 | 0.22 | 0.11 | 0.13 | 0.10 |

TABLE 1a-continued

Fresh Film

| Wavelength (nm) | Film 1 (comp.) | Film 2 (comp.) | Film 3 (inv.) | Film 4 (inv.) | Film 5 (comp.) |
|---|---|---|---|---|---|
| 360 | 0.27 | 0.11 | 0.09 | 0.10 | 0.09 |
| 370 | 0.13 | 0.09 | 0.08 | 0.09 | 0.08 |
| 380 | 0.09 | 0.08 | 0.07 | 0.08 | 0.07 |
| 390 | 0.08 | 0.07 | 0.07 | 0.08 | 0.07 |
| 400 | 0.07 | 0.07 | 0.07 | 0.06 | 0.06 |
| 500 | 0.06 | 0.06 | 0.06 | 0.05 | 0.05 |

TABLE 1b

Aged Film

| Wavelength (nm) | Film 1 (comp.) | Film 2 (comp.) | Film 3 (inv.) | Film 4 (inv.) | Film 5 (comp.) |
|---|---|---|---|---|---|
| 320 | 5.00 | 3.32 | 2.46 | 2.25 | 2.79 |
| 330 | 4.79 | 2.04 | 0.95 | 1.28 | 1.30 |
| 340 | 3.74 | 1.03 | 0.58 | 0.68 | 0.81 |
| 350 | 3.37 | 0.61 | 0.42 | 0.45 | 0.55 |
| 360 | 2.62 | 0.40 | 0.33 | 0.35 | 0.39 |
| 370 | 2.29 | 0.30 | 0.27 | 0.28 | 0.31 |
| 380 | 1.76 | 0.22 | 0.22 | 0.23 | 0.23 |
| 390 | 1.22 | 0.18 | 0.17 | 0.18 | 0.20 |
| 400 | 0.78 | 0.15 | 0.15 | 0.14 | 0.16 |
| 500 | 0.07 | 0.07 | 0.07 | 0.06 | 0.06 |

The data reported in Table 1 show that comparison film 1, obtained with a bisphenol-fluorene polyarylate not substituted in the bisphenol ortho positions, dramatically increases the absorbance values measured at 400 nm, the blue light absorption range, with the consequence of an undesired strong yellow coloration. Comparison films 2 and 5 obtained by polymerizing bisphenolfluorenes bearing substituents in the ortho positions thereof outside the scope of the present invention show better results than film 1 but not completely satisfactory. Films 3 and 4 (invention), obtained by polymerizing bisphenolfluorenes bearing substituents in the ortho positions thereof within the scope of the present invention, have a very little increase of the absorbance value measured in the range of 400 nm after a 50 hour exposure, with respect to the value of the virgin film.

Films 1 to 5 were also subjected to UV ageing tests by using a Fusion F300 Lamp System produced by Fusion UV Systems Inc. equipped with a D bulb. Sample film yellowing was measured by comparing their absorbance, before and after the expositions, at the selected wavelength of 400 nm which was identified as the most significant (blue light absorption). Optical absorbance was measured by a Perkin-Elmer Lambda 2 spectrophotometer working in the 320–500 nm range. The Yellowing Coefficient (Yc) is defined as the ratio of the averaged variation of absorbance of a polymeric film exposed to a UV radiation source and the effective exposure energy. The maximum exposure energy employed was up to 4.8 J/cm$^2$. The lower is the Yc value, the best is the result. The results were summarized in the following Table 1c.

TABLE 1c

| Sample | Yc |
|---|---|
| 1 (comparison) | 0.0055 |
| 2 (comparison) | 0.0007 |
| 3 (invention) | 0.0018 |

TABLE 1c-continued

| Sample | Yc |
|---|---|
| 4 (invention) | 0.0017 |
| 5 (comparison) | 0.0023 |

Table 1c clearly shows that only Films 3 and 4 of the present invention have a good yellowing coefficient values (Yc lower than 0.0020).

Example 2

Films 2 to 5 were cut into 70 mm long and 15 mm wide stripes and introduced into an Instron 5564 dynamometer working with a 50 mm jaw spacing. Table 2 shows the resulting values of tensile strength (expressed in MegaPascal) and Young modulus (expressed in GigaPascal).

TABLE 2

| Mechanical properties | Tensile strength (MPa) | Young modulus (Gpa) |
|---|---|---|
| Film 1 (Comparison) | 90 | 2.5 |
| Film 2 (Comparison) | 78 | 2.8 |
| Film 3 (Invention) | 120 | 3.4 |
| Film 4 (Invention) | 100 | 2.8 |
| Film 5 (Comparison) | 133 | 3.2 |

Table 2 shows that the comparison film 2, obtained from a polyarylate consisting of a bisphenolfluorene in all ortho positions thereof substituted only with methyl groups, has a particularly low tensile strength with respect to films 3 and 4 of the invention, obtained by polymerizing bisphenolfluorenes having at least one ortho-substituent other than methyl group. The tensile strength of comparison film 2 is even lower than that of comparison film 1. Such a low tensile strength gives the film 2 worse mechanical properties, thus making it more fragile and therefore more sensitive to breaking caused by mechanical stresses during the film processing and converting. Young modulus is also improved when using films 3 and 4 of the invention.

Example 3

Films 2 to 5 were thermally characterized by means of a) a Perkin-Elmer DSC-4 Differential Scanning Calorimeter, by following a heating ramp of 10° C./min. starting from a temperature of 50° C. up to 400° C. under a continuous nitrogen stream, determining the glass transition temperature value (Tg) and b) a thermogravimetric analysis by means of a Perkin Elmer TGS-2 Thermogravimetric Analyser/Microbalance Model AR-2, following a heating ramp of 10° C./min starting from a temperature of 50° C. up to 800° C., determining the decomposition temperatures under air and nitrogen flow. Table 3 reports the values of such thermal properties expressed in ° C.

TABLE 3

| Thermal properties | Film 2 (comparison) | Film 3 (invention) | Film 4 (invention) | Film 5 (comparison) |
|---|---|---|---|---|
| Glass transition temperature (Tg) | 334 | 342 | 346 | 365 |
| Air decomposition temperature | 350 | 385 | 387 | 408 |

TABLE 3-continued

| Thermal properties | Film 2 (comparison) | Film 3 (invention) | Film 4 (invention) | Film 5 (comparison) |
|---|---|---|---|---|
| Nitrogen decomposition temperature | 357 | 394 | 392 | 408 |

Table 3 shows that comparison film 2, obtained from a polyarylate consisting of bisphenolfluorene in all ortho positions thereof substituted only with methyl groups, has a glass transition temperature (Tg) lower than that of films 3 and 4 of the present invention, which were obtained on the contrary with compounds not having only methyl groups as substituents in the bisphenolfluorene ortho positions.

Moreover, comparison film 2 exhibits both air and nitrogen decomposition temperature values definitely lower than those of films 3 and 4 of the present invention. The decrease in the decomposition temperature of film 2, which is too close to the glass transition temperature, makes it difficult to use the film at temperatures near Tg, whereto many processings are performed (such as stretching, extrusion, lamination). The wide interval between decomposition temperature and Tg in films 3 and 4 of the present invention allows them to be used at temperatures near or even higher than their Tg without thereby causing decomposition phenomena.

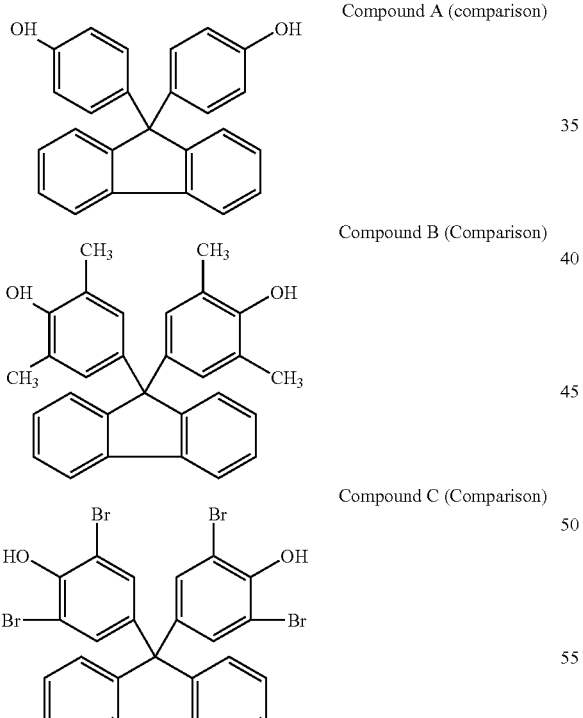

Compound A (comparison)

Compound B (Comparison)

Compound C (Comparison)

The invention claimed is:

1. A polymeric optical film the polymer of the polymeric optical film consisting essentially of one or more polyarylates having repeating units represented by the general structure:

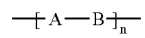

wherein A represents one or more different bisphenolfluorene radicals having the general formula (I):

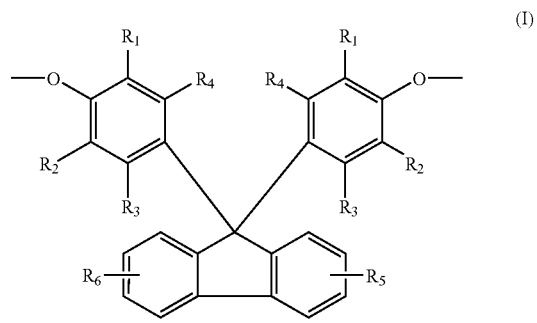

wherein $R_1$ and $R_2$ independently represent an alkyl group, a halogen atom, an alkoxy group, an acyl group, a phenyl group or a nitrile group, with the proviso that $R_1$ and $R_2$ are not both an alkyl group; $R_3$, $R_4$, $R_5$ and $R_6$ represent a hydrogen atom, an alkyl group, a halogen, an alkoxy group, an acyl group, a phenyl group, a nitro group, or a nitrile group, with the proviso that when $R_1$ and $R_2$ are both bromide atoms, at least one of $R_3$, $R_4$, $R_5$ and $R_6$ is different from hydrogen atom;

B represents one or more different dicarboxy radicals having the formula:

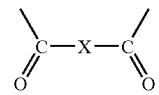

wherein X is a divalent aromatic hydrocarbon group having from 6 to 20 carbon atoms, and n is the number of the repeating units which build up the polymer and is a positive integer higher than 20.

2. The optical film of claim 1, wherein said bisphenolfluorene radical A is represented by the formula:

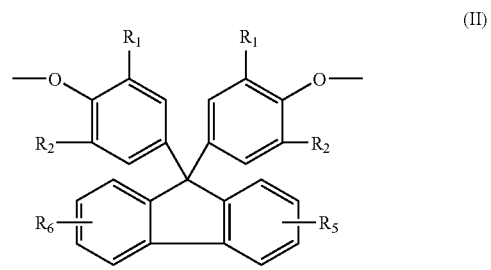

wherein $R_1$ and $R_2$ represent an alkyl group or a halogen with the proviso that $R_1$ and $R_2$ are not both an alkyl group; and wherein X in said dicarboxy radical B is a 6 to 12 carbon atom divalent aromatic hydrocarbon group.

3. The optical film of claim 1, wherein said divalent aromatic hydrocarbon group X is selected from the group consisting of:

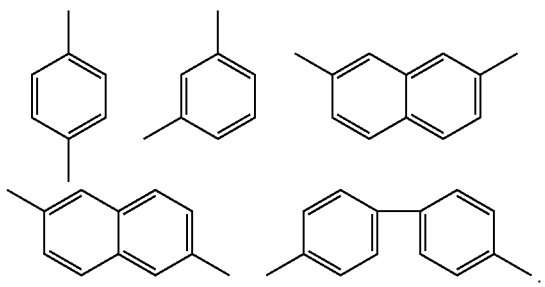

4. The optical film of claim 1, wherein said one or more polyarylates are represented by the formula:

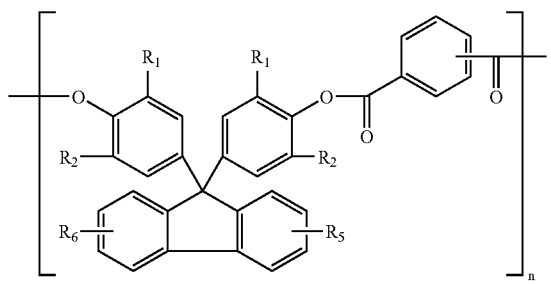

wherein $R_1$ and $R_2$ represent an alkyl group, a halogen atom, an alkoxy group, an acyl group, a phenyl group or a nitrile group, with the proviso that $R_1$ and $R_2$ are not both an alkyl group; $R_5$ and $R_6$ represent a hydrogen atom, an alkyl group, a halogen, an alkoxy group, an acyl group, a phenyl group, a nitro group, or a nitrile group, with the proviso that when $R_1$ and $R_2$ are both bromide atoms, at least one of $R_5$ and $R_6$ is different from hydrogen atom; and n is a positive integer higher than 20.

5. The optical film of claim 3, wherein said one or more polyarylates comprise a at least a first dicarboxy radical according to the formula

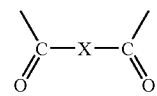

and a second dicarboxy radical differing in structure from said at least a first dicarboxy radical, the second dicarboxy radical having the formula

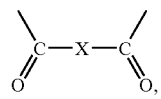

the weight ratio between said first dicarboxy radical and said second dicarboxy radical being of from 1:10 to 10:1 and X is as previously defined.

6. The optical film of claim 5, wherein said first dicarboxy radical is deriving from isophthalic acid and said second dicarboxy radical is deriving from terephthalic acid.

7. The optical film of claim 6, wherein the weight ratio between said first and second dicarboxy radicals is of from 1:4 to 4:1.

8. The optical film of claim 1, wherein said one or more polyarylates are selected from the group consisting of:

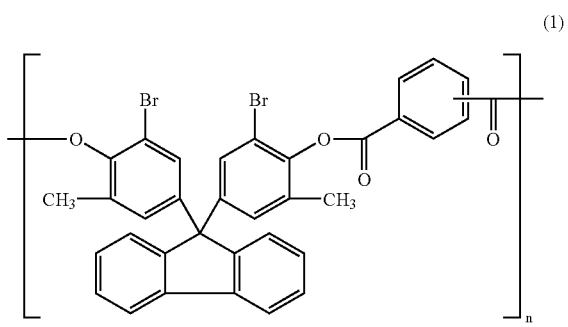

(1)

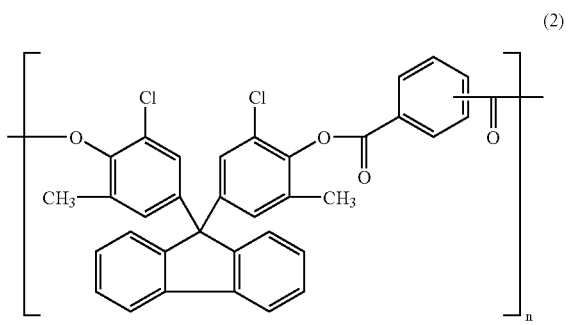

(2)

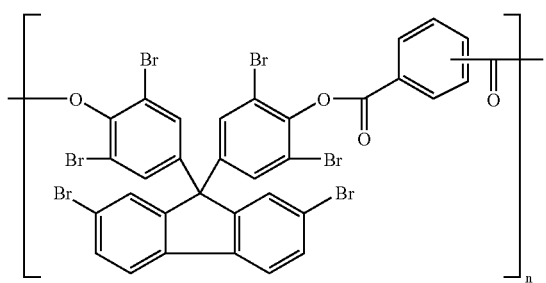
(3)
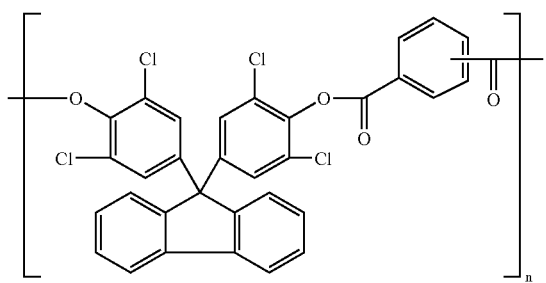
(4)
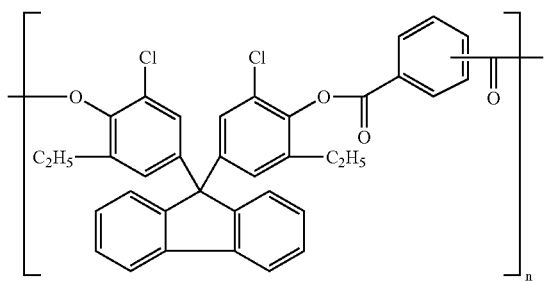
(5)
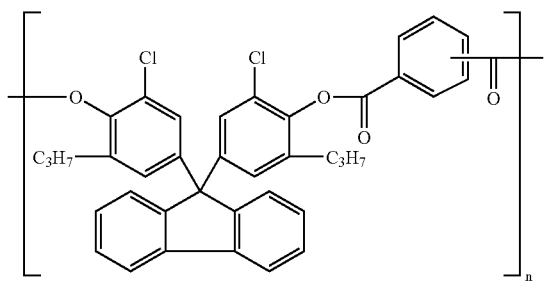
(6)
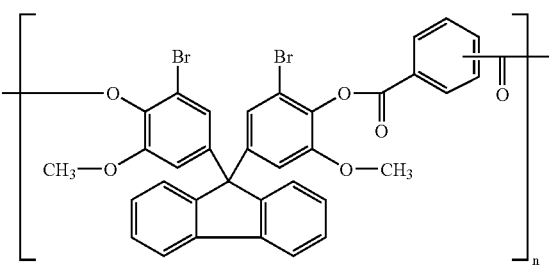
(7)

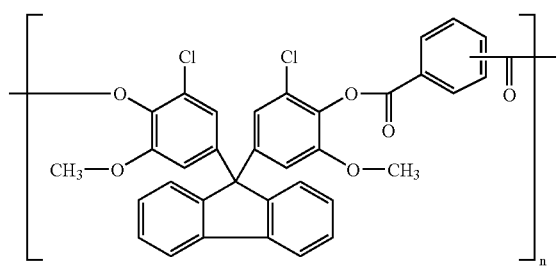
(8)
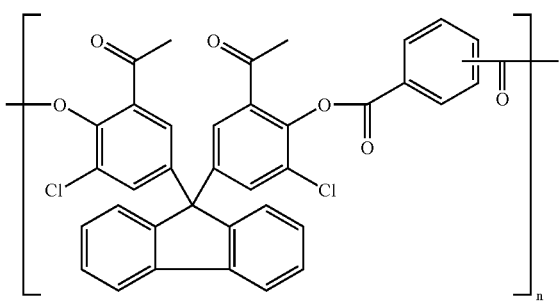
(9)
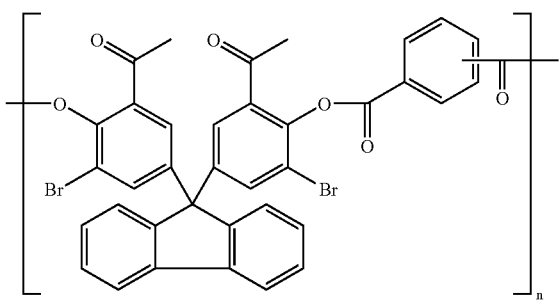
(10)
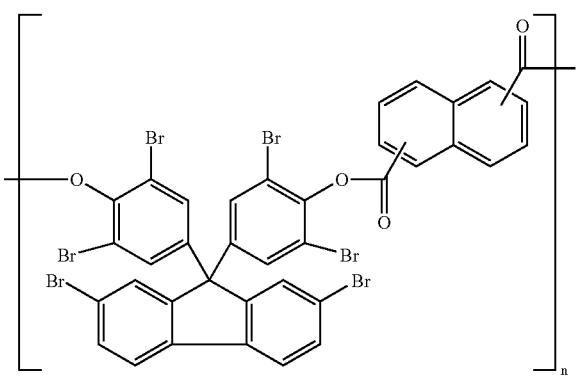
(11)

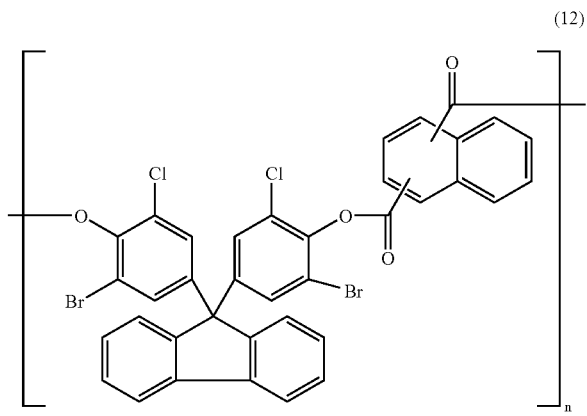
(12)
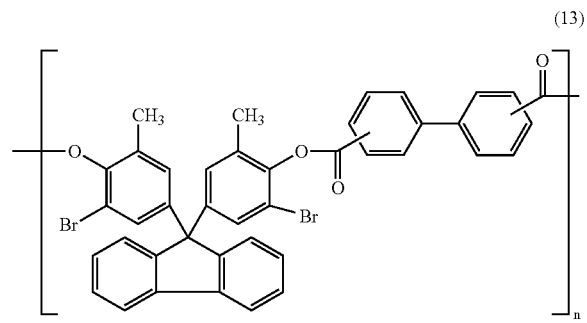
(13)
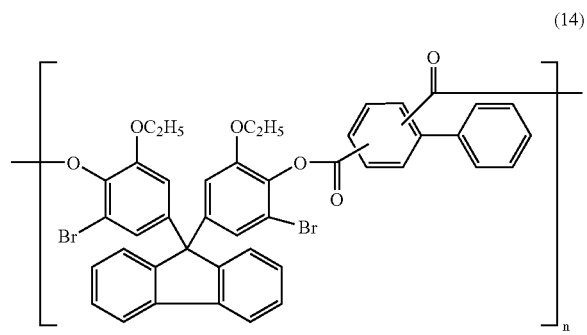
(14)
wherein n is the number of repeating units and is an integer higher than 20.
9. A polymeric optical film wherein the polymer of the optical film consists of one or more polyarylates having repeating units represented by the general structure:
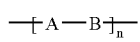
wherein A represents one or more different bisphenolfluorene radicals having the general formula (I):
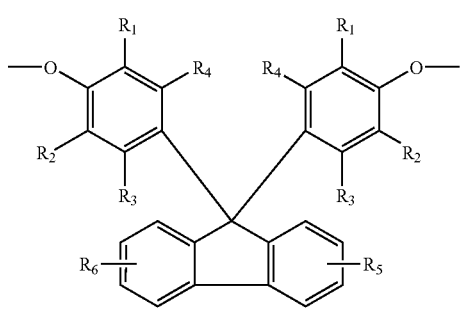
(I)

wherein $R_1$ and $R_2$ independently represent an alkyl group, a halogen atom, an alkoxy group, an acyl group, a phenyl group or a nitrile group, with the proviso that $R_1$ and $R_2$ are not both an alkyl group; $R_3$, $R_4$, $R_5$ and $R_6$ represent a hydrogen atom, an alkyl group, a halogen, an alkoxy group, an acyl group, a phenyl group, a nitro group, or a nitrile group, with the proviso that when $R_1$ and $R_2$ are both bromide atoms, at least one of $R_3$, $R_4$, $R_5$ and $R_6$ is different from hydrogen atom;

B represents one or more different dicarboxy radicals having the formula:

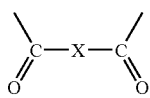

wherein X is a divalent aromatic hydrocarbon group having from 6 to 20 carbon atoms, and n is the number of the repeating units which build up the polymer and is a positive integer higher than 20.

10. The polymeric optical film of claim 9, wherein said bisphenolfluorene radical A is represented by the formula:

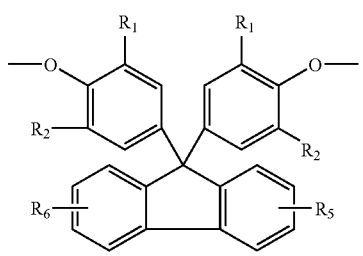

(II)

wherein $R_1$ and $R_2$ represent an alkyl group or a halogen with the proviso that $R_1$ and $R_2$ are not both an alkyl group; and wherein X in said dicarboxy radical B is a 6 to 12 carbon atom divalent aromatic hydrocarbon group.

11. The polymeric optical film of claim 9, wherein said divalent hydrocarbon group X is selected from the group consisting of:

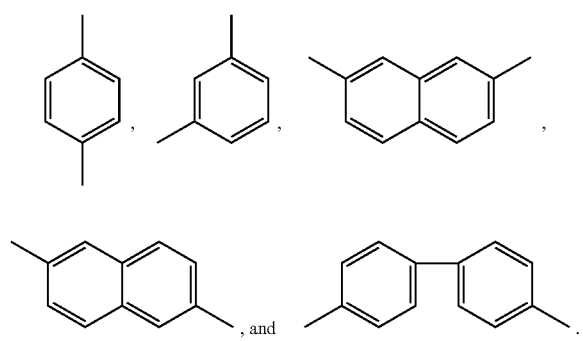

12. The polymeric optical film of claim 9, wherein said one or more polyarylates are represented by the formula:

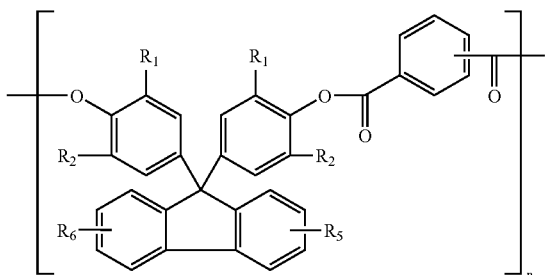

wherein $R_1$ and $R_2$ represent an alkyl group, a halogen atom, an alkoxy group, an acyl group, a phenyl group or a nitrile group, with the proviso that $R_1$ and $R_2$ are not both an alkyl group; $R_5$ and $R_6$ represent a hydrogen atom, an alkyl group, a halogen, an alkoxy group, an acyl group, a phenyl group, a nitro group, or a nitrile group; and n is a positive integer higher than 20; and wherein with the proviso that when $R_1$ and $R_2$, are both bromide atoms, at least one of $R_3$, $R_4$, $R_5$ and $R_6$ is different from hydrogen atom.

13. The optical film of claim 11, wherein said one or more polyarylates comprise a at least a first dicarboxy radical according to the formula

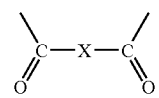

and a second dicarboxy radical differing in structure from said at least a first dicarboxy radical, the second dicarboxy radical having the formula

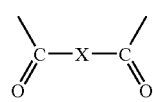

the weight ratio between said first dicarboxy radical and said second dicarboxy radical being of from 1:10 to 10:1 and X is as previously defined.

14. The optical film of claim 13, wherein said first dicarboxy radical is derived from isophthalic acid and said second dicarboxy radical is derived from terephthalic acid.

15. The optical film of claim 14, wherein the weight ratio between said first and second dicarboxy radicals is of from 1:4 to 4:1.

16. The optical film of claim 1 wherein the polymer has a Tg of between 342° C. and 365° C.

17. The optical film of claim 6 wherein the polymer has a Tg of between 342° C. and 365° C.

18. The optical film of claim 9 wherein the polymer has a Tg of between 342° C. and 365° C.

19. The optical film of claim 14 wherein the polymer has a Tg of between 342° C. and 365° C.

20. A liquid crystal screen comprising at least one panel or flattened layer represented by the optical polymeric film of claim 1.

21. An electroluminescent screen comprising at least one support and protective layer represented by the optical polymeric film of claim 1.

22. A polarizer transparent conducting film comprising at least one layer represented by the optical polymeric film of claim 1.

23. A liquid crystal screen comprising at least one panel or flattened layer represented by the optical polymeric film of claim 9.

24. An electroluminescent screen comprising at least one support and protective layer represented by the optical polymeric film of claim 9.

25. A polarizer transparent conducting film comprising at least one layer represented by the optical polymeric film of claim 9.

* * * * *